United States Patent
Medapalli et al.

(10) Patent No.: US 8,488,610 B2
(45) Date of Patent: Jul. 16, 2013

(54) SYSTEM AND METHOD FOR COMMUNICATING PACKET IN A WIRELESS MULTICAST AND BROADCAST COMMUNICATION NETWORK

(75) Inventors: Kameswara Medapalli, Santa Clara, CA (US); Louay Jalloul, Santa Clara, CA (US); Kamlesh Rath, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1145 days.

(21) Appl. No.: 11/803,974

(22) Filed: May 16, 2007

(65) Prior Publication Data

US 2008/0285537 A1 Nov. 20, 2008

(51) Int. Cl.
*H04L 12/56* (2006.01)

(52) U.S. Cl.
USPC ........... 370/394; 370/329; 370/229; 370/231; 370/236; 370/428; 370/349

(58) Field of Classification Search
USPC ............. 455/59, 63.1–65, 67.13, 67.16, 101, 455/107–113; 370/217–228, 252, 253, 277–282, 370/294–295, 328, 342–345, 478, 480, 394, 370/349, 329, 229, 231, 236, 428, 522
See application file for complete search history.

(56) References Cited

U.S. PATENT DOCUMENTS

| | | | |
|---|---|---|---|
| 7,061,915 B2 | 6/2006 | Seidel et al. | |
| 2002/0093937 A1* | 7/2002 | Kim et al. | 370/349 |
| 2004/0057530 A1* | 3/2004 | Tarokh et al. | 375/267 |
| 2004/0196780 A1* | 10/2004 | Chin et al. | 370/208 |
| 2006/0057958 A1* | 3/2006 | Ngo et al. | 455/7 |
| 2006/0195752 A1* | 8/2006 | Walker et al. | 714/748 |
| 2006/0270360 A1* | 11/2006 | Han et al. | 455/69 |
| 2007/0014237 A1* | 1/2007 | Nishibayashi et al. | 370/229 |
| 2008/0019310 A1* | 1/2008 | Sebire et al. | 370/329 |
| 2009/0221315 A1* | 9/2009 | Kim et al. | 455/517 |
| 2010/0014601 A1* | 1/2010 | Mo et al. | 375/260 |
| 2010/0120361 A1* | 5/2010 | Rappaport | 455/18 |
| 2011/0246846 A1* | 10/2011 | Ojala et al. | 714/748 |

FOREIGN PATENT DOCUMENTS

WO WO2005/078976 A1 8/2005

* cited by examiner

*Primary Examiner* — Manpreet Matharu
(74) *Attorney, Agent, or Firm* — Sterne, Kessler, Goldstein & Fox P.L.L.C.

(57) ABSTRACT

A method and system for communicating packets in a Wireless Multicast and Broadcast communication network is provided. The method includes selecting a Modulation and Coding Scheme (MCS) for transmission of a packet. The packet is then transmitted using the selected MCS on at least one of a subset of available time slots, a subset of available frequency sub-carriers and a subset of available antennas. Thereafter, it is autonomously decided whether the plurality of transmitters are to retransmit the packet. Then, the packet is retransmitted on at least one of a different subset of time slots, a different subset of frequency sub-carriers and a different subset of antennas.

20 Claims, 6 Drawing Sheets

SYSTEM AND METHOD FOR COMMUNICATING PACKET IN A WIRELESS MULTICAST AND BROADCAST COMMUNICATION NETWORK

BACKGROUND OF THE INVENTION

The present invention relates generally to a communication network. More particularly, the present invention relates to a communication network wherein the information is communicated to multiple end-points via multicast or broadcast. Examples of such networks include those offering Multicast and Broadcast Services (MBS).

In a MBS communication network that includes one or more Base Transceiver Stations (BTS) and a plurality of Mobile stations (MS), the signal reception quality of a MS depends on its geographical position with respect to the BTSs. Therefore, MSs located in different geographical places have different signal reception quality. For example, a first MS which is located nearer to the BTS will have a high signal reception quality and a second MS, which is located at a distance greater than the distance of first MS from the BTS, has a lower signal reception quality as compared to the first MS.

In conventional systems, when a plurality of data packets are transmitted from the BTS, the number of error-free packets received by an MS depends on its geographical location. The words data packets and packets are used interchangeably. The source of error may be because of one or more of poor communication link, due to traffic load, noise and interference. Therefore, in order to ensure that MSs having low signal reception quality receive packets correctly without any loss, the BTS transmits its packets at a low data rate using a Modulation and Coding Scheme (MCS) in which the modulation order is low, e.g. QPSK rate 1/2. This results in an inefficient use of bandwidth or spectrum as the MCS is focused for MSs having a low signal reception quality as even the MSs having high signal reception quality are provided a low data rate.

Additionally, in some conventional systems, reliability of communications is ensured by receiving feedback from MSs in the form of Acknowledgment (ACK)/Negative ACK (NACK) signals to the BTS. An ACK indicates successful reception of one or more packets and a NACK indicates erroneous reception of one or more packets by one or more MSs. If a NACK is received from a MS, the BTS based on the NACK may determine a suitable MCS for retransmitting the corresponding packet to the MS. However, transmission of ACK/NACK from the plurality of MSs may result in the ACK/NACK implosion problem. In this case, the BTS is overloaded due to increased traffic of ACK/NACK messages.

There is therefore a need for a method and system for communicating packets in a MBS communication network, which improves communication reliability without receiving feedback from MSs.

SUMMARY

An embodiment provides a method and system for communicating packets in a communication network.

Another embodiment provides a method and system that improves communication reliability by selective retransmission of packets.

Yet another embodiment provides a method and system that increases spectral efficiency by exploiting space-diversity, time-diversity and frequency-diversity.

Another embodiment provides a method and system that dynamically determines the packets that have to be retransmitted and the time or frequency at which the packets have to be retransmitted without the need for any feedback from the MSs in order to ensure that all the users receive data without any packet loss.

Embodiments described below include a system and a method for communicating a packet in a communication network. The method comprises selecting a Modulation and Coding Scheme (MCS) for transmission of a packet. The packet is then transmitted using the selected MCS on at least one of a subset of available time slots, a subset of available frequency sub-carriers and a subset of available antennas. Thereafter, it is autonomously decided whether the plurality of transmitters are to retransmit the packet. Then, the packet is retransmitted on at least one of a different subset of time slots, a different subset of frequency sub-carriers and a different subset of antennas.

BRIEF DESCRIPTION OF DRAWINGS

The foregoing objects and advantages of the present invention, a system and method for communicating packets in a communication network, may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Various embodiments described herein provide methods and systems for communicating packets in a communication network. The communication network may be a MBS communication network. Examples of the MBS communication network may include, but not limited to, IEEE 802.16e, code-division multiple access (CDMA2000) network, and Universal Mobile Telecommunication system-Wideband Code Division Multiple Access (UMTS-WCDMA).

Figure 1:
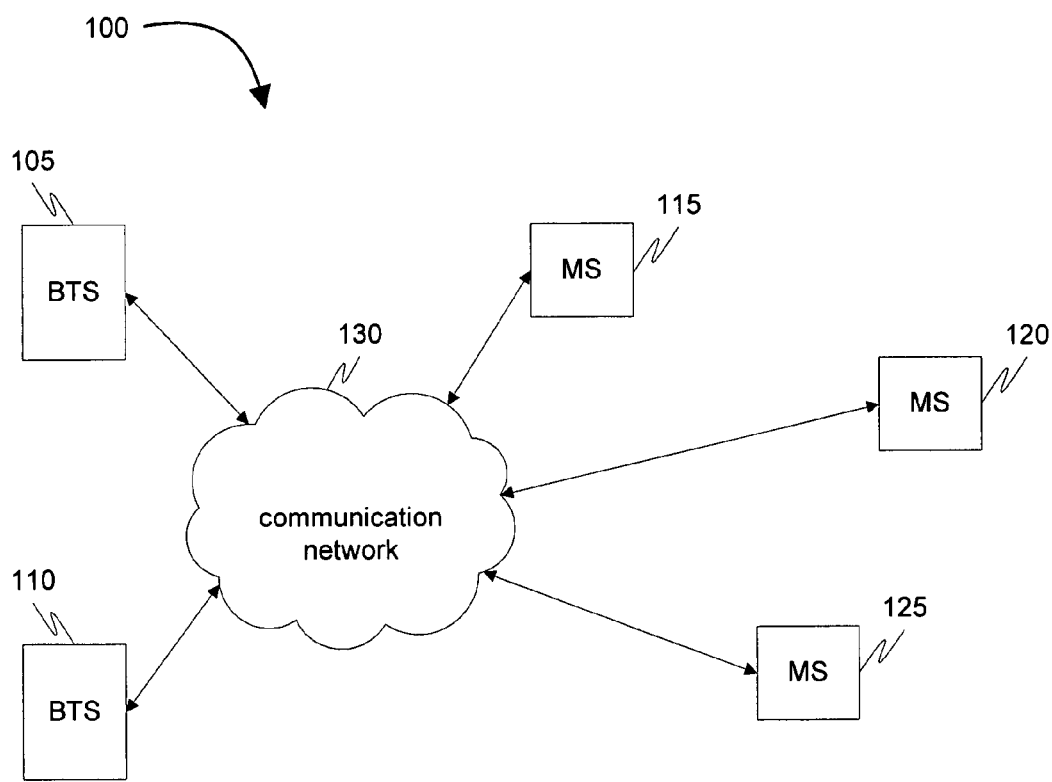
FIG. 1 is block diagram showing an environment (that is exemplary) in which various embodiments of the invention can function.

FIG. 1 is a block diagram showing an environment 100 (that is exemplary) in which various embodiments of the invention may function. Environment 100 includes a Base Transceiver Station (BTS) 105, a BTS 110, a Mobile Station (MS) 115, a MS 120, and a MS 125. BTS 105 and BTS 110 communicate with one or more of MS 115, MS 120, and MS 125 through a communication network 130 to transmit and receive data. Examples of communication network 130 may include, but are not limited to, IEEE 802.16e, IEEE CDMA200 and UMTS-WCDMA. Communication network 130 may be a MBS communication network.

Figure 2:
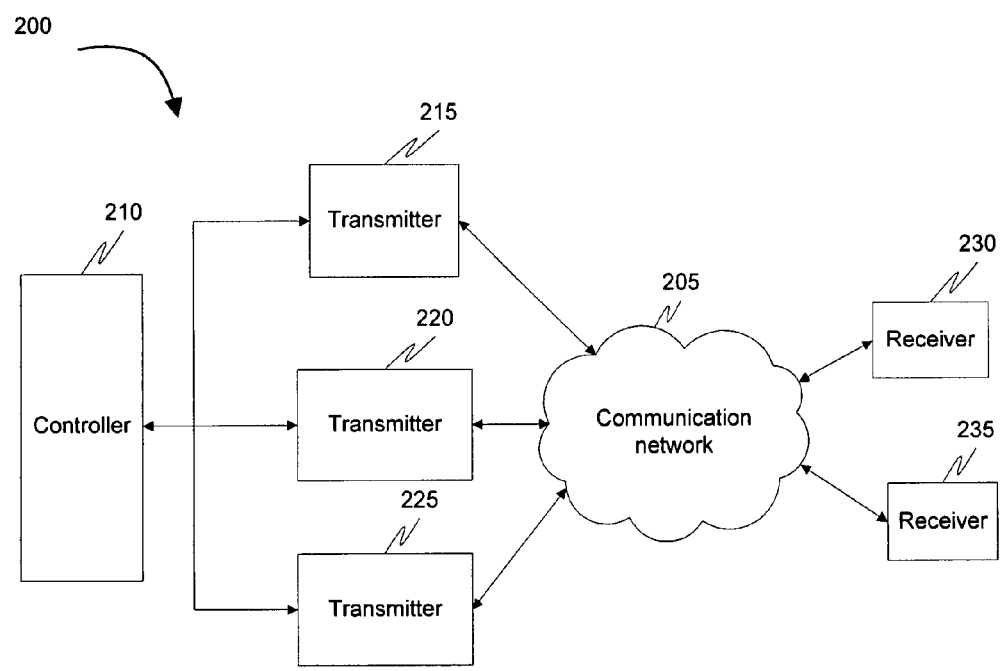
FIG. 2 is a block diagram showing a system for communicating a packet in a communication network, in accordance with an embodiment.

FIG. 2 is a block diagram showing a system 200 for communicating a packet in a communication network 205, in accordance with an embodiment. System 200 includes a controller 210, a transmitter 215, a transmitter 220, a transmitter 225, a receiver 230, and a receiver 235. It will be apparent to people skilled in the art that system 200 may comprise more than three transmitters and more than two receivers. A BTS may include one or more of transmitter 215, transmitter 220 and transmitter 225. Similarly, a MS may include one or more of receiver 230 and receiver 235.

The packet is multicasted from each of transmitter 215, transmitter 220 and transmitter 225. Controller 210 selects a Modulation and Coding Scheme (MCS) for transmitting the packet. Thereafter, each of transmitter 215, transmitter 220, and transmitter 225 transmits the packet on one or more of a subset of available time slots, a subset of available frequency sub-carriers and a subset of available antennas through communication network 205. The packet is received by one or more of receiver 230 and receiver 235. In an embodiment, the packet received by a receiver may be error prone. Therefore, controller 210 autonomously decides whether one or more of transmitter 215, transmitter 220, and transmitter 225 are to retransmit the packet. Controller 210 may not receive a feedback from one or more of receiver 230 and receiver 235 receiving the packet. In an embodiment, controller 210 ranks the packet amongst a plurality of packets. Thereafter, controller 210 weighs retransmission of each packet based on corresponding ranking. Therefore, controller 210 decided retransmission based on the rank and the weight of the packet amongst the plurality of packets.

Controller 210 assigns the rank and the weight to the packet based on one or more of an application layer information, a pseudo random number generated by a pseudo random number generator, and priority information.

The application layer information is embedded in the header of one or more packets and may be extracted by decoding the header. Examples of the application layer information may include, but are not limited to encoded media type and frame type within a particular media type. When application layer information is available in the header of the packet, characteristics of the application layer information, for example, application traffic, is used to determine a packet that needs to be retransmitted and the time and/or frequency at which the packet has to be retransmitted.

Priority information associated with a packet may be set based on one or more of the destination of the packet, data length of the packet, the data type of the packet and higher layer information. For example, video packets are encoded as Intra picture frames, Predicted picture frames, and Bi-predictive or Bi-directional picture frames based on MPEG-1 standard in video applications. An Intra picture frame may be referred to as I-frame, a Predicted picture frame may be referred to as P-frame, and a Bi-predictive or Bi-directional picture frame may be referred to as B-frame. I-frame can be decoded independently as it is self decodable. A P-frame is encoded using a preceding P-frame, therefore if the preceding P-frame is lost during transmission, the P-frame cannot be decoded. A time of transmission of the preceding P-frame precedes the time of transmission of the P-frame. Similarly, a B-frame is decoded using each of a preceding B-frame and a succeeding B-frame. A time of transmission of a succeeding B-frame succeeds a time of transmission of the B-frame. Therefore, an I-frame, which does not depend on other frames for decoding can be retransmitted more frequently than P-frames and B-frames. P-frames, which require a preceding P-frame for decoding, can be retransmitted less frequently than I-frames. Further, B-frames, which require a preceding B-frame and a succeeding B-frame for decoding, can be retransmitted least frequently as compared to I-frames and P-frames.

The pseudo-random number generator marks a packet with a predefined number. The predefined number determines if a packet needs to be retransmitted or not. For example, the pseudo-random generator may assign packets a number '1' or a number '0'. Number '1' assigned to a packet may imply that the packet may be retransmitted and number '0' assigned to a packet may imply that a packet may not be retransmitted.

After controller 210 decides the retransmission of the packet, each of transmitter 215, transmitter 220, and transmitter 225 retransmits the packet on one or more of a different subset of time slots, a different subset of frequency sub-carriers, and a different subset of antennas which are different from the subset of time slots, the subset of frequency sub-carriers, and the subset of antennas used for transmitting the packet. One or more of receiver 230 and receiver 235 receives and combines the transmitted packet and the retransmitted packet.

Controller 210 selects a Modulation and Coding Scheme (MCS) for retransmitting the packet based on the use of Chase combining or Incremental Redundancy (IR) to combine the transmitted packet and the retransmitted packet at one or more receiver 230 and receiver 235. If the transmitted packet and retransmitted packet are to be combined using Chase combining at one or more of receiver 230 and receiver 235, controller 210 selects a modulation order for the retransmitted the packet such that it is similar to the modulation order of the transmitted packet. Additionally, controller 210 selects a coding rate for retransmitted the packet such that it is dissimilar to the coding rate of the transmitted packet.

Alternately, if the transmitted packet and the retransmitted packet are to be combined using Incremental Redundancy (IR), controller 210 selects a modulation order and a coding rate for the retransmitted packet such that one or both of the modulation order and the coding rate for the retransmitted packet and the transmitted packer are dissimilar.

Figure 3:
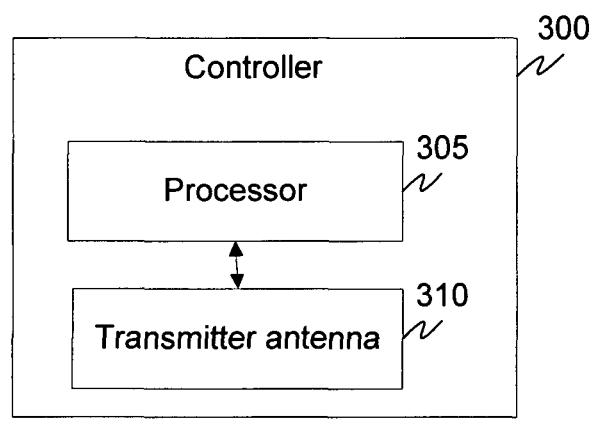
FIG. 3 is a block diagram showing a controller for facilitating communication of a packet in a communication network, in accordance with an embodiment.

FIG. 3 is a block diagram showing a controller 300 for facilitating communication of a packet in communication network 205, in accordance with an embodiment. Controller 300 is a controller 210 for one or more BTSs. Controller 300 includes a processor 305 and a transmitter antenna 310. Processor 305 selects a Modulation and Coding Scheme (MCS) for transmission of a packet and also autonomously decides whether the packet is to be retransmitted or not. This has been explained in detail in conjunction with FIG. 2. Thereafter, transmitter antenna 310 transmits the packet to one or more BTSs.

Figure 4:
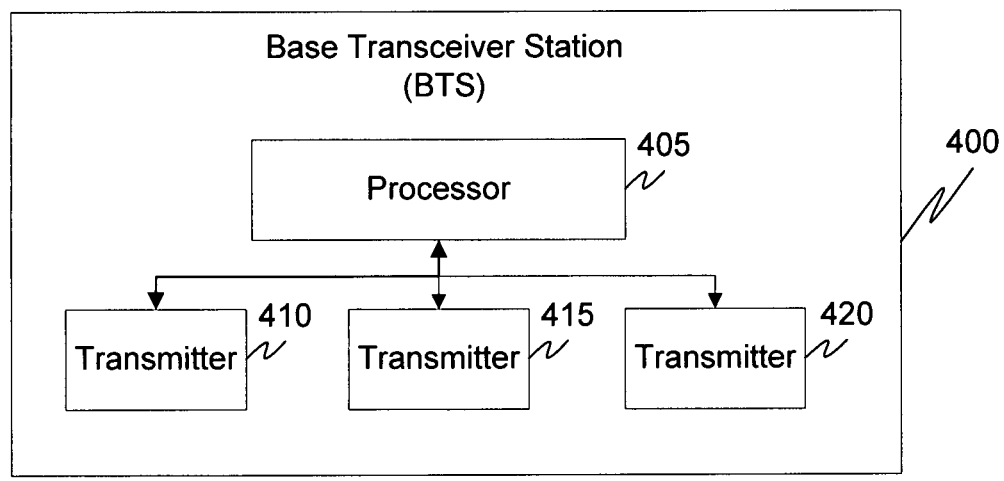
FIG. 4 is a block diagram showing a BTS for communicating a packet in a communication network, in accordance with an embodiment.

FIG. 4 is a block diagram showing a BTS 400 for communicating a packet in communication network 205, in accordance with an embodiment. BTS 400 is a BTS. BTS 400 includes a processor 405, a transmitter 410, a transmitter 415, and a transmitter 420. It will be apparent to the people skilled in the art that BTS 400 may include more than three transmitters. Processor 405 schedules transmission of the packet on one or more of a subset of available time slots, a subset of available frequency sub-carriers and a subset of antennas. Each of transmitter 410, transmitter 415, and transmitter 420 transmit the packet on one or more of the subset of available time slots, the subset of available frequency sub-carriers and the subset of the available antennas. Thereafter, processor 405 may schedule retransmission of the packet on one or more of a different subset of time slots, a different subset of frequency sub-carriers, and a different subset of antennas. Thereafter, each of transmitter 410, transmitter 415, and transmitter 420 retransmits the packet on one or more of the different subset of time slots, the different subset of frequency sub-carriers, and the different subset of antennas.

Figure 5:
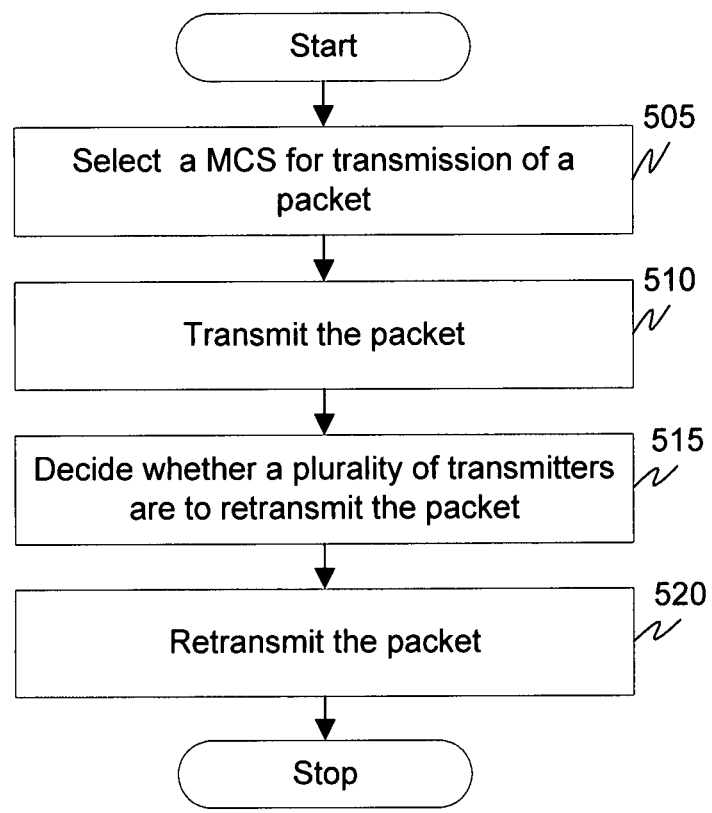
FIG. 5 is a flow chart for a method for communicating a packet in a communication network, in accordance with an embodiment.

FIG. 5 is a flow chart of a method for communicating a packet in communication network 205, in accordance with an embodiment. In an embodiment, a physical layer in communication network 205 uses Orthogonal Frequency Division Multiplexing (OFDM) to communicate the packet. In this case, multiple access is obtained by dividing each of the frequency and time space into groups of frequency sub-carriers and time symbols, for example, OFDMA. In another embodiment, a physical layer in communication network 205 uses spread spectrum modulation to communicate the plurality of packets. In this case, multiple access is obtained by Code Division Multiple Access (CDMA). At 505, controller 210 selects a Modulation and Coding Scheme (MCS) for transmitting the packet. Thereafter, at 510, the packet is transmitted by each of transmitter 215, transmitter 220, and transmitter 225 on one or more of a subset of time slots, a subset of frequency sub-carriers, and a subset of antennas. The packet is received by one or more of receiver 230 and receiver 235. One or more of receiver 230 and receiver 235 may not receive the packet or one or more bits in the packet received may be erroneous.

Therefore, at 515, controller 210 autonomously decides whether each of transmitter 215, transmitter 220, and transmitter 225 are to retransmit the packet. Controller 210 may decide the retransmission of packet without receiving a feedback from one or more of receiver 230 and receiver 235. Controller 210 may decide the retransmission of the packet based on ranking of the packet among other packets and the weight of the packet. The ranking of the packets is carried out based on one or more of application layer information, priority information associated with one or more packets, and a pseudo random number. This has been explained in detail in conjunction with FIG. 2. After controller 210 determines the need for retransmitting the packet, at 520, the packet is retransmitted by each of transmitter 215, transmitter 220 and transmitter 225, on one or more of a different subset of time slots, a different subset of frequency sub-carriers and a different subset of antennas, which are distinct from the subset of time slots, frequency sub-carriers and antennas used for transmitting the packet.

For retransmitting the packet, modulation order and coding rate is selected by controller 210 based on whether the transmitted packet and the retransmitted packet are combined using Chase combining or Incremental Redundancy in one or more of receiver 230 and receiver 235. This has been explained in detail in conjunction with FIG. 2 given above. The retransmitted packet is received by one or more of receiver 230 and receiver 235. Thereafter, the transmitted packet and the retransmitted packet are combined using one of Chase combining and Incremental Redundancy.

As an example of the method given above, a packet is transmitted from BTS 105 using a MCS, in which the modulation order is high and the coding rate is low, for example, 16 QAM rate 1/2, in a first portion of the time-frequency group. Thereafter, the packet is retransmitted from BTS 110 to achieve spatial/time/frequency diversity using, the same MCS, i.e., 16 QAM rate 1/2. The packet is retransmitted using a different transmit antenna and in a second portion of the time-frequency group, to achieve time-frequency diversity. As MCS for transmitted packet and the retransmitted packet is the same, i. e, 16QAM rate 1/2, therefore, it is equivalent to transmitting the packet using QPSK rate 1/2. Thereafter, the retransmitted packet is soft combined with the transmitted packet using Chase combining to generate a combined packet. As a result of this, MS 115 having a high channel quality is able to receive the transmitted packet without any error. Additionally, MS 120 having a low channel quality experiences the same data rate as, QPSK rate 1/2, as each of the retransmitted packet and the transmitted packet are transmitted using 16 QAM rate 1/2, but due to Chase combining a combined packet is generated that has improved reliability of being decoded by MS 120 as compared to the transmitted packet.

Figure 6:
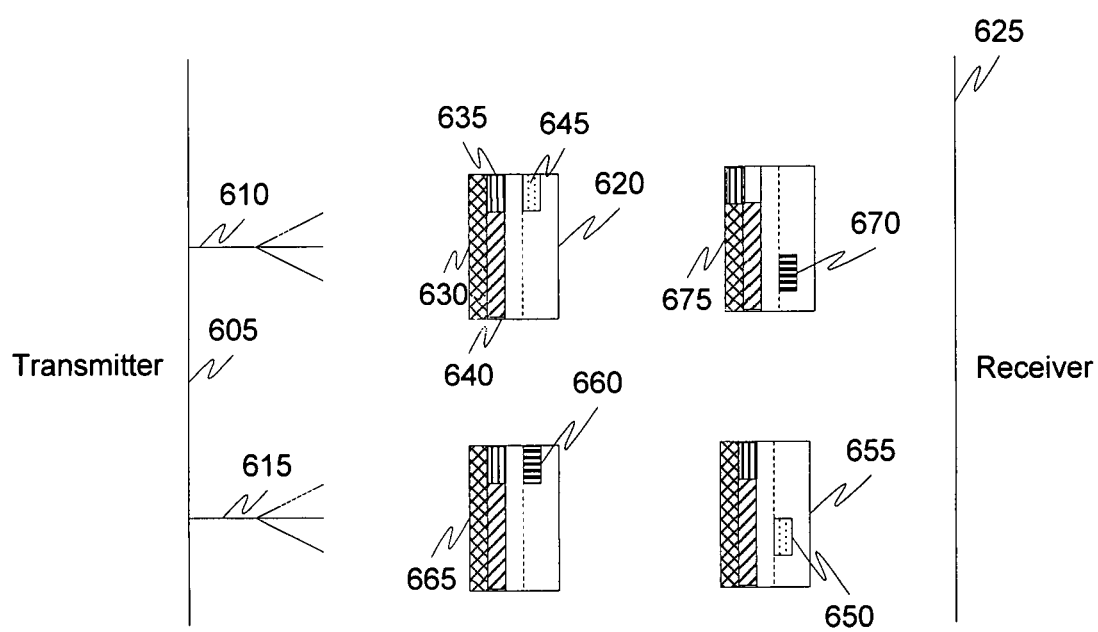
FIG. 6 is a block diagram showing the combining of a transmitted packet and a retransmitted packet in a communication network, in accordance with an exemplary embodiment.

FIG. 6 is a block diagram showing the combining of a transmitted packet and a retransmitted packet in communication network 205, in accordance with an exemplary embodiment. A transmitter 605 includes an antenna 610 and an antenna 615. Transmitter 605 transmits a frame 620 using antenna 610 to a receiver 625. Frame 620 includes a preamble 630, a Frame Control Header (FCH) information 635, a downlink (DL), Uplink (UL) MAP 640, and a data packet 645. Antenna 610 transmits data packet 645 in a first portion of a time-frequency group to receiver 625. Receiver 625 may not receive data packet 645 or one or more bits in data packet 645 received by receiver 625 may be erroneous. Therefore, controller 210 autonomously decides that transmitter 605 is to retransmit data packet 645. This has been explained in detail in conjunction with FIG. 2 given above.

Thereafter, transmitter 605 transmits a data packet 650, which is a retransmission for data packet 645, in a frame 655, which is transmitted after frame 620, using antenna 615 in a second portion of the time-frequency group to receiver 625. Therefore, data packet 645 and data packet 650 are transmitted in different time slots, different frequency sub-carriers, and different antennas. Receiver 625 combines data packet 645 and data packet 650 using one of Chase combining and Incremental Redundancy.

Similarly, transmitter 605 transmits a data packet 660 in a frame 665 using antenna 615 in the first portion of the time-frequency group. When controller 210 autonomously decides that transmitter 605 is to retransmit data packet 660, transmitter 605 transmits a data packet 670, which is a retransmission for data packet 660, in a frame 675 in the second portion of the time-frequency group using antenna 610. Receiver 625 combines data packet 660 and data packet 670 using one of Chase combining and Incremental Redundancy.

Various embodiments of the present invention provide methods and systems for communicating a packet in a communication network. The system and method dynamically determine the packets that have to be retransmitted and the time or frequency at which the packets have to be retransmitted without the need for any feedback messages such as ACK/NACK. Therefore, problems that arise due to huge flow of ACK/NACK messages are eliminated. Further, the system and method selects suitable MCS for the retransmitted packet depending on the method used to combine the transmitted packet and the retransmitted packet.

The system and method increases data rate and increases or maintains the data reception quality as in the conventional systems, such that, the MS having high signal reception quality is able to benefit from the increased data rate and the MS having low signal reception quality is able to benefit from the increased data reception quality. To increase the data reception quality, one or more packets are retransmitted from the BTS based on one or more of application layer information, priority information and a random method.

What is claimed:
1. A device for communicating a packet in a communication network, comprising:
a plurality of transmitters, each transmitter in the plurality of transmitters configured to transmit the packet on a subset of available time slots, a subset of available frequency sub-carriers, or a subset of available antennas; and a controller configured to:
select a modulation and coding scheme (MCS) for transmission of the packet,
assign to the packet, irrespective of data from a receiver of the packet, a retransmission rank among a plurality of packets and a retransmission weight based on the retransmission rank, and
decide whether the plurality of the transmitters are to retransmit the packet based on the retransmission rank and the retransmission weight associated with the packet, wherein
each transmitter in the plurality of transmitters is further configured to retransmit the packet on at least one of a different subset of time slots, a different subset of frequency sub-carriers, and a different subset of antennas based on the decision.

2. The device of claim 1, wherein the retransmission rank is based on a pseudo random number generated by a pseudo random number generator of the device.

3. The device of claim 1, wherein the retransmission rank is based on an application layer information.

4. The device of claim 1, wherein a modulation order selected for the retransmitted packet is similar to a modulation order selected for the transmitted packet when the transmitted packet and the retransmitted packet are to be combined using Chase combining at the receiver.

5. The device of claim 1, wherein a modulation order selected for the retransmitted packet is dissimilar from a modulation order selected for the transmitted packet when the transmitted packet and the retransmitted packet are to be combined using incremental redundancy.

6. A Base Transceiver Station (BTS) for communicating a packet in a communication network, the BTS comprising:
a processor configured to:
schedule transmission of the packet on a subset of available time slots, a subset of available frequency sub-carriers, or a subset of available antennas;
assign to the packet, irrespective of data from a receiver of the packet, a retransmission rank among a plurality of packets and a retransmission weight based on the retransmission rank; and
schedule retransmission of the packet on at least one of a different subset of time slots, a different subset of frequency sub-carriers, and a different subset of antennas, including deciding whether to retransmit the packet based on the retransmission rank and the retransmission weight associated with the packet; and
a plurality of transmitters, wherein each transmitter is configured to:
transmit the packet on at least one of the subset of available time slots, the subset of available frequency sub-carriers, and the subset of available antennas; and
retransmit the packet on at least one of a different subset of time slots, a different subset of frequency sub-carriers and a different subset of antennas based on the decision of the processor.

7. A method, in a device, for communicating a plurality of packets in a communication network, the method comprising:
selecting, in the device, a modulation and coding scheme (MCS) format for transmission of a packet from among the plurality of packets;
transmitting, by each transmitter of a plurality of transmitters in the device, the packet on a subset of available time slots, a subset of available frequency sub-carriers, or a subset of available antennas;
assigning the packet, irrespective of data from a receiver of the packet, a retransmission rank among a plurality of packets and a retransmission weight based on the retransmission rank, and
deciding, in the device, whether the plurality of the transmitters are to retransmit the packet based on the retransmission rank and the retransmission weight associated with the packet; and
retransmitting, by each transmitter of the plurality of transmitters in the device, the packet on at least one of a different subset of time slots, a different subset of frequency sub-carriers, and a different subset of antennas based on the decision.

8. The method of claim 7, wherein the assigning the retransmission rank to the packet includes assigning the retransmission rank to the packet based on a pseudo random number generated by a pseudo random number generator.

9. The method of claim 7, wherein the assigning the retransmission rank to the packet includes assigning the retransmission rank to the packet based on an application layer information.

10. The method of claim 7, wherein a modulation order selected for the retransmitted packet is similar to a modulation order of the transmitted packet when the retransmitted packet and the transmitted packet are to be combined using Chase combining at the receiver.

11. The method of claim 7, wherein a modulation order selected for the retransmitted packet is dissimilar from a modulation order selected for the transmitted packet when the retransmitted packet and the transmitted packet are to be combined using incremental redundancy.

12. The device of claim 1, wherein the controller is configured to select a modulation and coding scheme (MCS) for retransmission of the packet based on a combination scheme to be used by the receiver to combine a transmitted packet and a retransmitted packet.

13. The BTS of claim 6, wherein the processor is configured to select a modulation and coding scheme (MCS) for transmission of the packet, and to select a modulation and coding scheme (MCS) for retransmission of the packet based on a combination scheme to be used by the receiver to combine a transmitted packet and a retransmitted packet.

14. The method of claim 7, further comprising:
selecting a modulation and coding scheme (MCS) for retransmission of the packet based on a combination scheme to be used by the receiver to combine a transmitted packet and a retransmitted packet.

15. The device of claim 1, wherein a coding rate selected for the retransmitted packet is dissimilar from a coding rate selected for the transmitted packet when the transmitted packet and the retransmitted packet are to be combined using incremental redundancy.

16. The method of claim 7, wherein a coding rate selected for the retransmitted packet is dissimilar from a coding rate selected for the transmitted packet when the retransmitted packet and the transmitted packet are to be combined using incremental redundancy.

17. The device of claim 3, wherein the controller is configured to obtain the application layer information from a header included in the packet.

18. The device of claim 17, wherein the controller is configured to determine a time and a frequency at which the packet is to be retransmitted based on a characteristic of the application layer information.

19. The device of claim 1, wherein the retransmission weight is based on a destination of the packet or on a data length of the packet.

20. The device of claim 1, wherein a coding rate selected for the retransmitted packet is dissimilar from a coding rate selected for the transmitted packet when the transmitted packet and the retransmitted packet are to be combined using Chase combining at the receiver.

\* \* \* \* \*